A. DU PUY.
NUT LOCK.
APPLICATION FILED MAY 7, 1917.
1,348,787.
Patented Aug. 3, 1920.
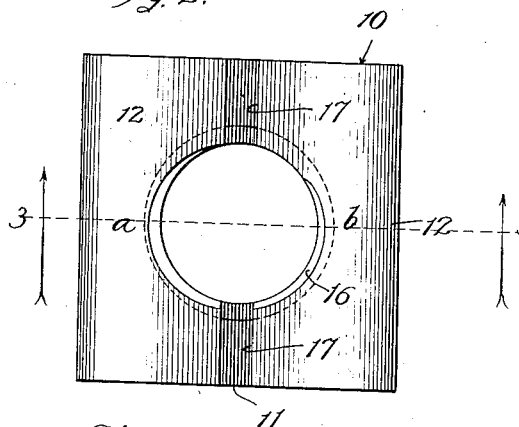
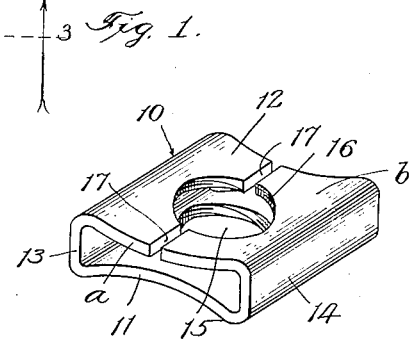
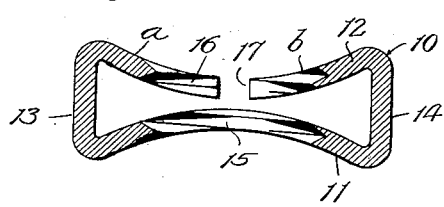
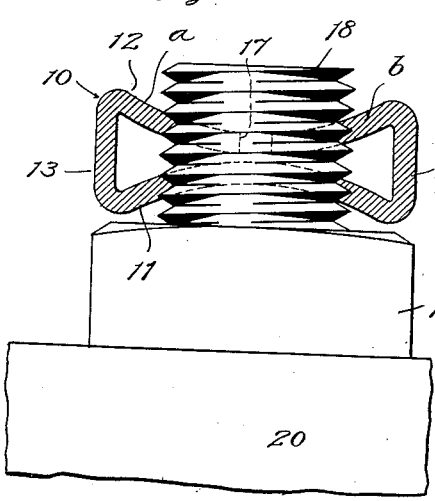
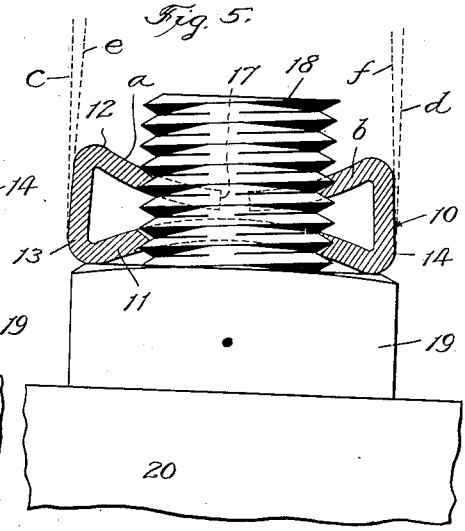
Witnesses:
Chas. H. Bull
Irwin C. Bowman
Inventor:
Alfred Du Puy,
By Poole & Brown
Attys.

UNITED STATES PATENT OFFICE.

ALFRED DU PUY, OF OAK PARK, ILLINOIS.

NUT-LOCK.

1,348,787.   Specification of Letters Patent.   Patented Aug. 3, 1920.

Application filed May 7, 1917. Serial No. 166,810.

*To all whom it may concern:*

Be it known that I, ALFRED DU PUY, a citizen of the United States, residing at Oak Park, in the county of Cook and State of Illinois, have invented new and useful Improvements in Nut-Locks, of which the following is a specification.

This invention relates to a nut-lock of that character which is screwed on the threaded end of a bolt in the same manner as and after an ordinary nut is applied thereto for the purpose of locking the ordinary nut on the bolt and against the member to be clamped.

One of the objects of my invention is to provide a nut-lock of the type referred to with spaced apart inner and outer walls, the latter being so curved and connected with each other at the sides of the nut-lock that, when the same is tightened against an ordinary nut with which it is designed more particularly for use, the spaced apart inner and outer walls will flex or move relative to each other, so as to cause the threads of the bolt holes in such walls to impinge against and grip the engaged threads of the bolt, thereby causing the nut-lock to have a double lock on the bolt, one about the bolt hole in the inner wall, and the other about the bolt hole in the outer wall.

Another object of my invention is to make said nut-lock from sheet metal, such as steel, by bending the same into form from a blank or strip of such metal.

A further object of my invention is to make the said nut-lock of a metal having such degree of resiliency that the walls of the nut-lock will spring back into their normal positions after being unscrewed from the ordinary nut with which it is used, so that said nut-lock may be used over and over again and will not be set or impaired by one application thereof.

The invention consists further in the matters hereinafter described and more particularly set forth in the appended claims.

In the accompanying drawings—

Figure 1 is a perspective view of a nut-lock constructed in accordance with my invention;

Fig. 2 is an enlarged top plan view of said nut-lock;

Fig. 3 is a sectional view taken on line 3—3 of Fig. 2;

Fig. 4 is an enlarged vertical sectional view, showing my nut-lock applied on the screw-threaded end of a bolt and in position before being screwed against the clamping nut previously applied on said bolt; and Fig. 5 is a like view of the same parts shown in Fig. 4, with the exception that said nut-lock is shown in position after it has been screwed tightly against the clamping nut, for locking the latter on said bolt and against the member to be clamped.

In the accompanying drawings, I have shown a nut-lock 10 constructed in accordance with my invention, and, as illustrated, said nut-lock has the general appearance of an ordinary nut, in the instance shown, of the square type, and is made, so to speak, hollow, that is, it has an inner or bottom wall 11 and an outer or top wall 12, which has all portions thereof out of contact with and spaced beyond or above said inner or bottom wall 11. Said inner and outer walls are integrally connected together, along those edges thereof at two of the opposite sides of the nut-lock, by substantially flat connecting walls 13, 14, which extend between said inner and outer walls along such sides of said nut-lock. The edges of said inner and outer walls 11, 12 along the two opposite sides of said nut-lock remain disconnected, thus leaving such sides of the nut-lock open, as shown, thus permitting said inner and outer walls to yield relative to each other and the side walls 13, 14 in the locking of said nut-lock on a bolt. The disconnected edges of said inner and outer walls are in alinement, so that a wrench or other tool may readily engage the nut-lock about the sides thereof for tightening the same against the ordinary type of nut with which said nut-lock is more particularly designed for use. The inner and outer walls 11, 12 are dished or curved toward each other from the connecting side walls 13, 14 toward the center of the nut-lock along lines of curvature extending transversely to said connecting walls, thus giving the inner and outer surfaces of the nut-lock a concaved appearance, and bringing the portions of said inner and outer walls centrally disposed between the connecting walls closer together than the portions of such walls adjacent said connecting walls. Each inner and outer wall is provided with a centrally disposed screw-threaded bolt hole 15, 16, said bolt holes being in alinement and of the same diameter and having threads of the same pitch, so that the nut-lock may be readily and easily screwed upon a threaded bolt, like an ordinary nut. The outer or top wall 12 is split or cut in half by a slot 17 arranged parallel to and interposed between said side walls 13, 14 and extending across the central portion of said outer wall 12 through the bolt hole 16 therein. Thus said slot 17 divides the outer wall 12 into two substantially equal parts or wing portions $a$, $b$, one being integral with and extending inwardly from the side wall 13, and the other being integral with and extending inwardly from the side wall 14. There is an equal portion of said bolt hole 16 in each part $a$, $b$, and the slot 17 separates the inner opposed edges of said winged parts $a$, $b$ to such an extent as to permit the same to flex inwardly or outwardly, while at the same time move toward each other for contracting the diameter of the bolt hole 16, when the nut is placed in use. It is preferable that the inner and outer walls 11, 12 be concaved, as shown, and that the radius of curvature for each of such walls be the same.

The nut-lock 10 shown in the drawings is bent to the shape shown from a blank or strip of sheet metal, such as steel or the like, and having a width equal to the like dimension of said nut-lock. The blank is made from a stock having the desired resiliency so that the inner and outer walls 11, 12 will give or yield for effecting the locking of the nut-lock on a bolt, yet of sufficient thickness to insure the necessary rigidity required for withstanding the pressure to which the nut-lock is subjected when placed in use. In bending the nut-lock 10 into the shape shown from a blank or strip of metal, the two wing portions $a$, $b$ of the outer or top wall 12 are formed by bending the end portions of the blank inward toward each other, and given the desired curvature, after the inner and side walls 11, 13, 14 have been formed. During the bending operation, the opposed edges of the wing portions $a$, $b$ are left separated so as to provide the slot 17 and permit the accomplishment of the function thereof.

In practice, the nut-lock 10 is screwed on the threaded end of a bolt 18 in the same manner as an ordinary nut, and after an ordinary clamping nut 19 has been applied upon said bolt and tightened against a member 20 to be clamped and through which the bolt extends. Said nut-lock 10 is screwed tightly against the clamp-nut 19 by a wrench or other tool, and, as the inner wall 11 of said nut-lock is curved as shown, only those edges of the inner wall along the side walls 13, 14 contact with the opposed face of the ordinary nut. When such edges are forced against the nut 19, the curved inner wall 11 is flexed and tends to flatten out, thereby causing the bolt hole 15 in said wall to be somewhat elongated or distorted and the screw threads thereof to impinge tightly against and grip the engaged threads of the bolt. The tendency is for such threads to be forced inward against the engaged threads of the bolt. Under such compression, the connecting walls 13, 14 are moved into a position inclined toward the bolt, thereby flexing and moving the winged portions $a$, $b$ inward and toward the bolt, thus contracting the diameter of the outer bolt hole 16, and causing the threads thereof to be forced into the roots and to tightly grip the engaged threads of the bolt. The inner and outer walls 11, 12 being spaced apart, but integrally connected together as shown, the locking of a nut-lock on a bolt is automatic, in that it takes effect as soon as the nut-lock is tightened against the previously applied ordinary nut. Moreover, the inner and outer walls being spaced apart, the nut-lock grips the threads of the bolt at two distinct and separated places in the length of the bolt, one at one bolt hole and the other at the other bolt hole. In short, my nut-lock 10 has a double lock on the bolt. The outer bolt hole 16 being contracted, the threads thereof grip the engaged threads of the bolt at all points about said bolt hole. The inner bolt hole 15 being, in a sense, bent or distorted, there is a tendency for the threads thereof to be waved, and thus cause the engaged threads of the bolt to be gripped about all points of such bolt hole. The gripping force of the nut-lock on the bolt is of course increased as the nut-lock is forced against the clamp-nut to be locked. In Fig. 5, the dotted lines $c$, $d$ indicate the normal positions of the side walls 13, 14 before the nut-lock is tightened against the clamping nut 19, while the dotted lines $e$, $f$ indicate the inclined positions taken by said side walls 13, 14 when the nut-lock is tightened against the clamp-nut 19.

The nut-lock 10 being made as shown and of spring metal, the walls of the same spring back into their normal positions when the nut-lock is unscrewed from engagement with an ordinary nut. Thus, the nut-lock may be used over and over again, and does not become set in one application, as in the case of those nut-locks which are made solid. Moreover, by being bent up from a strip or blank of sheet metal, the operation may be made by dies and the like, thus reducing the cost of making, both as to material used and labor and time required.

Although I have shown a nut-lock 10 made square, yet it is to be understood that my invention may be embodied in other shapes, without departing from the spirit and scope thereof.

I claim as my invention:

1. A nut-lock, comprising concave inner and outer walls having a space therebetween and being connected together at two opposite sides thereof, and said inner and outer walls being provided with alined screw-threaded bolt holes.

2. A nut-lock, comprising concave inner and outer walls having a space therebetween and being integrally connected together at two opposite sides thereof, said inner and outer walls being provided with alined screw-threaded bolt holes, and one of said walls being split along a line extending through the bolt hole therein and interposed between the means connecting said inner and outer walls.

3. A nut-lock, comprising concave inner and outer walls, having a space therebetween, two oppositely disposed side walls integrally connecting said inner and outer walls, the latter being provided with alined screw-threaded bolt holes, and said outer wall being split along a line extending through the bolt hole therein and arranged between and substantially parallel to said side walls.

4. A nut-lock, made from a blank of sheet metal and being bent into a form comprising a concave inner wall, two oppositely disposed side walls integral with and projecting outwardly from said inner wall, said side walls having the outer marginal portions thereof bent inwardly toward each other and given a concave form to form the outer wall of said nut-lock; the two portions of said outer wall having their opposed edges spaced apart, and said inner and outer walls being provided with alined screw-threaded bolt holes.

5. The combination with a screw-threaded bolt and an ordinary nut applied thereon, of a nut-lock adapted to be screwed on said bolt in the same manner as said ordinary nut, for locking the latter on said bolt, and said nut-lock being provided with concave inner and outer walls having a space therebetween and adapted, and when said nut-lock is tightened against said bolt, to flex relative to each other and cause the threads of the bolt holes in said walls to impinge against and grip the engaged threads of the bolt at two distinct and separated places in its length.

In testimony that I claim the foregoing as my invention, I affix my signature in the presence of two witnesses, this 26th day of April, A. D. 1917.

ALFRED DU PUY.

Witnesses:
EUGENE C. WANN,
CLARA L. PEOPLES.